Feb. 3, 1959    G. COELHO    2,871,613
CRAB TRAP
Filed Jan. 22, 1958

INVENTOR.
George Coelho
BY

2,871,613
CRAB TRAP
George Coelho, Elizabeth, N. J.
Application January 22, 1958, Serial No. 710,486
1 Claim. (Cl. 43—92)

This invention relates to new and useful improvements in a trap for catching crabs and other crustaceans and like forms of anthropods and is more particularly directed to a structure which may be conveniently manipulated in an automatic manner so as to grip crustaceans and the like between the jaws thereof.

The invention resides in the particular arrangement, construction, and relationship of the various elements of the trap, as disclosed in the accompanying description in which the following objects of the invention will be apparent.

The principal object hereof is to provide a crustacean trap having a pair of jaws actuated by the movement of a bait hook as the crustacean nibbles on the bait impaled thereon and also having a plurality of teeth or points on said jaws to facilitate retention of the crustacean in the trap.

One of the primary purposes of my invention is to provide structural and operational improvement in devices of the class to which reference has been made, which improvements not only simplify the structure as such, but also provide important distinct advantages in strength, durability, efficiency and the like.

Some of the advantages of the invention reside in its simplicity of construction, in its efficient and dependable operation, and in its adaptability to economical manufacture.

A further object hereof is to provide a crab trap having the advantageous structural features and the inherent meritorious characteristics herein described.

An added feature of the invention resides in the provision of a strong and durable apparatus of the above mentioned type, with parts thereof constructed and coacting so as to reduce costly machining operations and to facilitate manufacture as by molding or die casting and also to facilitate and expedite the assembly of various coacting parts.

Other objects will be in part obvious or in part pointed out hereinafter.

The invention is not limited in its application to the details of construction and arrangement of parts illustrated in these drawings, since the invention is capable of other embodiments. Here, I have illustrated an example of one embodiment of the invention wherein the parts are combined and arranged in accordance with one mode which I have devised for the practical application of the principles of the invention. It will be understood however that changes and alterations are contemplated and that other embodiments may be utilized within the scope of the claims, without departing from the basic principles and the contemplated scope of the present invention and that no limitations are to be implied from the following specific description.

It is to be further understood that the phraseology or terminology employed herein is for the purpose of description and not of limitation. Accordingly, limitation of this invention should be made only as determined by a proper interpretation of the terms used in the subjoined claims.

These, together with other incidental objects and advantages of my invention which subsequently will become apparent as the description proceeds, reside in the details of construction and operation as more fully hereinafter described and claimed and the features of novelty which characterize the invention will be pointed out with particularity in the claims annexed to and forming part of this specification.

To the accomplishment of the foregoing and related ends, said invention intended to be protected by Letters Patent then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In the accompanying drawing forming a part hereof, I have illustrated a complete example of a physical embodiment of the invention in which the parts are combined and arranged in accordance with one mode which I have devised for the practical application of the principles of the invention. It will be understood however that changes and alterations are contemplated and may be made in these exemplifying drawings and mechanical structures, within the scope of the claims, without departing from the principles of the invention.

Figure 1:
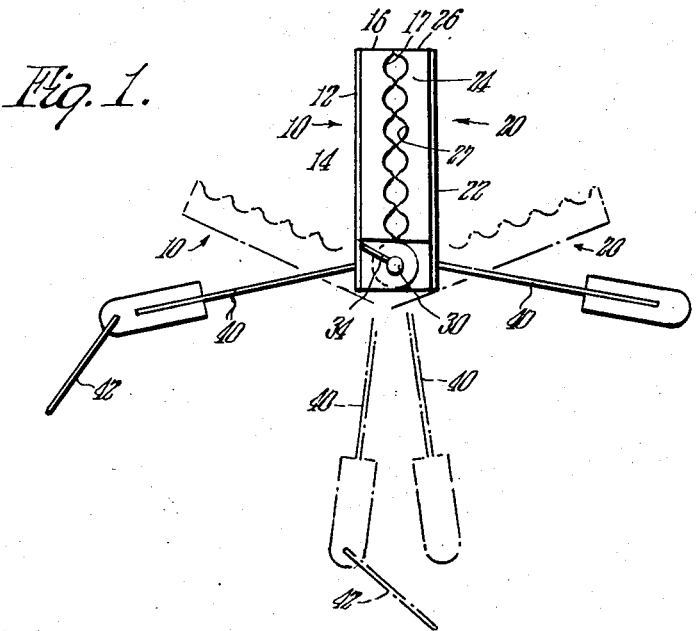
Fig. 1 is a small scale side elevation view of the device of the invention.
Figure 2:
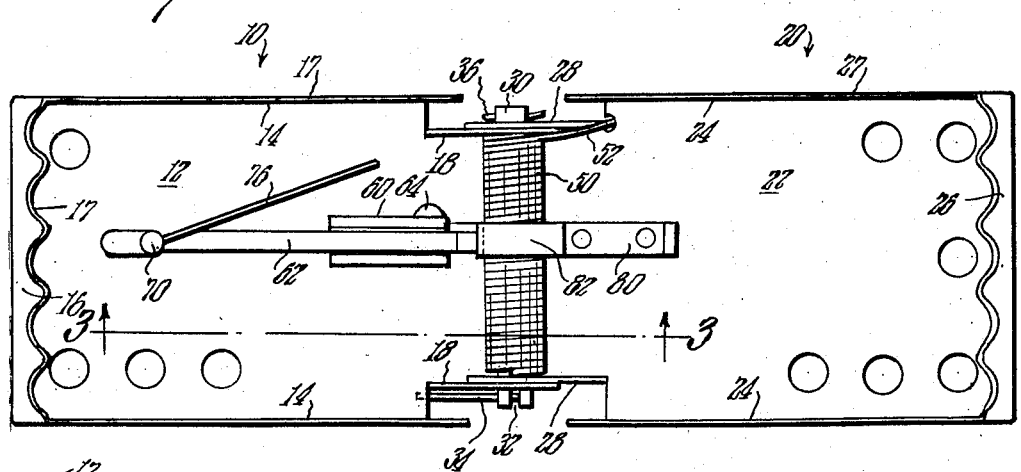
Fig. 2 is a top plan view of the device of the invention.
Figure 3:
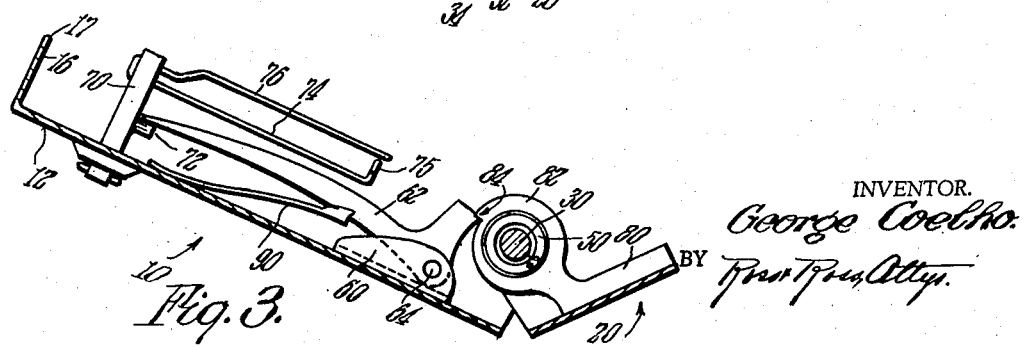
Fig. 3 is a sectional view of the device on the line 3—3 of Fig. 2.

In the following description and claim, various details will be identified by specific names for convenience. These names however are intended to be as generic in their application as the art will permit.

Referring now to the drawing forming a part of this specification more in detail, in which similar characteristics of reference indicate corresponding parts in the several views, and referring more particularly to the preferred form of my invention selected for illustrative purposes, I have shown the various components as being formed of metal or other suitable material, same being easily constructed and assembled.

10 generally designates a half section or jaw of the trap structure having a bottom wall 12, upwardly extending side walls 14, and an upwardly extending end wall 16 at the outer end thereof. The top edges of the side and end walls may be scalloped as at 17 to provide teeth. A pair of upwardly extending ears 18 are provided at the inner end thereof, same being spaced from each other and disposed adjacent opposite sides of the bottom walls.

20 generally designates the other half section or jaw of the trap structure having a bottom wall 22, upwardly extending side walls 24, and an upwardly extending end wall 26 at the outer end thereof. The top edges of the side and end walls may be scalloped as at 27 to provide teeth. A pair of upwardly extending ears 28 are provided at the inner end thereof, same being spaced from each other and disposed adjacent opposite sides of the bottom wall.

Half sections or jaws 10 and 20 are of similar design and configuration so as to be mated with each other when the top edges of the side and end walls of the half sections are brought into adjacency as best shown in solid lines in Fig. 1. When so positioned relative to each other, the structure is in the closed position.

The half sections 10 and 20 are held in pivoted relation to each other by means of a transverse pin member 30 extending through aligned openings in the adjacent ears 18 and 28 of each pair thereof at each side of the half sections.

The pin 30 is slotted as at 32 at one end thereof. A locking pin 34 may be extendable through an opening at the slotted end of the pin 30. Locking pin 34 locks the pin 30 to the half section 10, same having a free outer end being abuttable with the bottom wall 12 of the half section 10, as shown wherefore the pin 30 is held fast relative to the half section 10.

At the opposite end of the pin 30, a cotter pin 36 or the like ensures the retention of the half sections 10 and 20 on the pin 30.

Connected to the under side of each of the under or outer sides of the bottom walls 12 and 22 of the half sections 10 and 20 respectively is an outwardly extending manually engageable handle member 40. Same may be leaded at their outer ends to provide added weight if desired. The handles of the pair thereof are so arranged that they may be brought toward each other, as shown in dot-dash lines in Fig. 1, thereby causing the half sections to open relative to each other.

A loop member 42 may be pivotally fixed to the outer end of one of the handle members 40 whereby the handle members when brought into adjacency in the open position of the structure, may be held in such position by the looping of the loop member 42, over the other handle member 40.

A coil spring member 50 surrounds the pin 30 between the pairs of adjacent ears 18 and 28 at opposite sides of the structure.

At one end of the spring member 50, the free end 52 of said spring member extends outwardly to engage the bottom wall 22 of the half section 20 through an opening therein as shown. At the opposite end of the spring member 50, the free end 54 thereof extends outwardly and is receivable in the slot 32 of the pin 30. In this manner, the spring is thus engaged with the pin 30 which is held fast to the half section 10 by means of such spring. The half sections or jaws are normally held in the closed position relative to each other.

An upwardly extending bifurcated trigger housing 60 is provided on the inner wall of the bottom wall member 12 and an L shaped trigger 62 is held in pivotal relation therewith by means of a pin 64.

A bait post 70 extends upwardly from the bottom wall member 12 and is rotatable relative thereto. An aligning pin 72 extends transversely from the post intermediate the opposite ends thereof. At the top of the post, a bait holder or hook extends transversely therefrom. Same comprises a lower hook member 74 and an upper hook member 76 spaced therefrom in substantially parallel relation. The outermost free end of the lower hook member 74 has an upwardly extending hook portion 75 and the outermost free end of the upper hook member 76 may be engaged therewith, much as in the manner of the well known safety pin engaging means. When opened, the bait may be impaled upon one or the other of the members 74 and 76 and same may thereafter be locked together at their outer free ends.

A sear or catch 80 is fixed to the under side of the bottom wall member 22 and extends upwardly therefrom. It is provided with an uppermost ringlike portion 82 which encloses the pin 30 and the spring 50.

The outer periphery of the sear is provided with a trigger engaging notch 84. When the half sections or jaws 10 and 20 are moved into open positions, the inner end of the trigger 62 is urged upwardly by the action of a spring 90 so as to bear against the outer periphery of the sear until the notch 84 moves past the trigger 62 at which moment a clicking sound is heard. The trigger is caused to ride the notch much in the manner of the dwell in a cam.

As the operating handles are held in adjacency, the bait loaded members 74 and 76 are swung upon the post so as to be in alignment with and disposed over the trigger 62. The aligning pin 72 is disposed directly beneath the end of the trigger 62 so as to prevent same from being accidentally depressed and thereby released.

The trap is thus set.

As the crab crawls to the trap and eats the bait, the members 74 and 76 are pushed and rotated so as to cause the pin 72 to be moved from its trigger supporting position wherefore the trigger is free to be depressed. The action of the spring 50 is such as to cause the trigger to override the dwell in the sear wherefore the jaws or half sections are snapped to the closed position wherefore the crab is caught therebetween.

From the foregoing, the construction and operation of the device will be readily understood and further explanation is believed to be unnecessary. However, since numerous modifications and changes will readily occur to those skilled in the art, it is not desired to limit the invention to the exact construction shown and described.

While I have illustrated and described the invention as embodied in certain specific arrangements, it will be understood by those skilled in the art that the object of the invention may be attained by use of constructions different in certain respects from those disclosed without departing from the underlying principles of the invention.

I do not intend to be limited to the details shown since various suitable modifications and variations in structural changes may be made without departing in any way from the spirit of the invention. I therefore desire by the following claims to include within the scope of my invention all such suitable variations, modifications and equivalents by which substantially the results of my invention may be obtained through the use of substantially the same or equivalent means.

Without further analysis, the foregoing is intended to so fully reveal the gist of my invention that others can, by applying current knowledge, readily adapt it for various applications without omitting features which, from the standpoint of prior art, fairly constitute essential characteristics of the generic or specific aspects of this invention, and therefore, such adaptations should and are intended to be comprehended within the meaning range of equivalence of the claims below.

What it is desired to claim and secure by Letters Patent of the United States is:

A crab trap comprising, co-operating jaws being pivoted at their inner ends and being movable towards each other into a closed trapped position and away from each other into an open entrapping position, each of said jaws including a bottom wall and opposite inwardly extending side walls and an inwardly extending end wall at the outer end thereof, a pivot pin connecting said jaws to each other in said pivotal relation adjacent the inner ends of said jaws, jaw closing spring means enclosing said pivot pin and embracing each of said jaws for actuating said jaws into the normal closed trapped position, a trigger fulcrumed above the inner face of the bottom wall of one of said jaws and being depressible to permit closing of said jaws by the action of said spring means, a bait post swingably mounted on the inner face of the bottom wall of the said one jaw, releasable means fixed on said bait post for holding said trigger in the entrapping position, a bait holder fixed on said bait post for the impalement of bait thereon, a sear fixed to the inner face of the bottom wall of the other said jaw and having a trigger engaging notch for engaging said trigger and holding said jaws in the open entrapping position against the resistance of said spring means, all the foregoing being adapted and arranged whereby as bait is consumed by a crab said bait post is swung to effect release of said trigger for the release thereof out of the notch of said sear wherefore said jaws are sprung into the closed trapped position by the action of said spring means.

References Cited in the file of this patent

UNITED STATES PATENTS

| | | |
|---|---|---|
| 515,980 | Turner et al. | Mar. 6, 1894 |
| 761,926 | Van Loghem | Jan. 7, 1904 |
| 1,738,448 | Rollins | Dec. 3, 1929 |
| 1,877,264 | Booth | Sept. 13, 1932 |
| 1,893,974 | Zook | Jan. 10, 1933 |
| 2,363,740 | Melaas | Nov. 28, 1944 |